(12) United States Patent
Li et al.

(10) Patent No.: US 10,703,219 B2
(45) Date of Patent: Jul. 7, 2020

(54) VEHICLE BATTERY CHARGE SETPOINT CONTROL

(71) Applicant: FORD GLOBAL TECHNOLOGIES, LLC, Dearborn, MI (US)

(72) Inventors: Yonghua Li, Ann Arbor, MI (US); Johannes Geir Kristinsson, Ann Arbor, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1756 days.

(21) Appl. No.: 14/045,859

(22) Filed: Oct. 4, 2013

(65) Prior Publication Data
US 2015/0097512 A1    Apr. 9, 2015

(51) Int. Cl.
  *B60L 50/15*    (2019.01)
  *B60L 53/60*    (2019.01)
  *B60L 58/13*    (2019.01)
  *B60L 53/00*    (2019.01)

(52) U.S. Cl.
  CPC ............... *B60L 53/60* (2019.02); *B60L 53/00* (2019.02); *B60L 58/13* (2019.02); *B60L 2240/545* (2013.01); *B60L 2240/547* (2013.01); *B60L 2240/549* (2013.01); *B60L 2240/70* (2013.01); *B60L 2250/00* (2013.01); *B60L 2250/18* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/14* (2013.01); *Y02T 90/16* (2013.01)

(58) Field of Classification Search
  CPC ....... B60L 11/1838; B60L 58/12; B60L 58/13
  USPC .................................. 320/132, 65.265, 101
  See application file for complete search history.

(56) References Cited

U.S. PATENT DOCUMENTS

| | | | |
|---|---|---|---|
| 5,832,396 A * | 11/1998 | Moroto ................ | B60K 6/485 701/22 |
| 6,856,866 B2 | 2/2005 | Nakao | |
| 7,360,615 B2 * | 4/2008 | Salman ................ | B60K 6/52 180/65.265 |
| 7,659,698 B2 * | 2/2010 | Elder .................... | B60K 6/365 320/132 |
| 7,665,559 B2 | 2/2010 | De La Torre-Bueno | |
| 8,022,674 B2 * | 9/2011 | Miura .................. | B60W 20/00 180/65.29 |
| 8,054,038 B2 | 11/2011 | Kelty et al. | |
| 8,635,037 B2 * | 1/2014 | Quet ................ | H01M 8/04656 320/132 |
| 9,193,351 B2 * | 11/2015 | Zhao .................... | B60K 6/445 |

(Continued)

*Primary Examiner* — Drew A Dunn
*Assistant Examiner* — Tessema Kebede
(74) *Attorney, Agent, or Firm* — David B. Kelley; Brooks Kushman P.C.

(57) ABSTRACT

An adjustable vehicle traction battery charge setpoint strategy is disclosed which enables the adjustment of the maximum battery State of Charge (SOC) setpoint used for battery charging from an electric utility grid. Based on knowledge of the upcoming route and related driving behavior, the vehicle calculates a setpoint less than the maximum battery SOC charging setpoint so that when the vehicle begins operation, it can utilize regenerative braking and historical driving behavior to allow the battery charge to be maximized during the trip.

3 Claims, 6 Drawing Sheets

(56) References Cited

U.S. PATENT DOCUMENTS

| | | | |
|---|---|---|---|
| 2010/0235025 A1* | 9/2010 | Richter | B60L 15/2045 |
| | | | 701/22 |
| 2011/0066308 A1* | 3/2011 | Yang | B60W 20/11 |
| | | | 701/22 |
| 2013/0015860 A1* | 1/2013 | Crombez | G01R 31/36 |
| | | | 324/433 |
| 2013/0197730 A1* | 8/2013 | Huntzicker | B60L 11/16 |
| | | | 701/22 |
| 2014/0035526 A1* | 2/2014 | Tripathi | B60L 11/1838 |
| | | | 320/109 |
| 2014/0200756 A1* | 7/2014 | Sisk | B60L 11/1864 |
| | | | 701/22 |

* cited by examiner

VEHICLE BATTERY CHARGE SETPOINT CONTROL

TECHNICAL FIELD

This disclosure relates to adjusting a vehicle battery charge setpoint based on anticipated increases in battery state of charge from regenerative events.

BACKGROUND

A hybrid-electric or all-electric vehicle has a traction battery to store and provide energy for vehicle propulsion. In order to improve performance and battery life, it is necessary to operate the battery within certain limits. Operating the battery outside of the limits may decrease the performance or life of the battery. The battery may be charged via the power grid when parked, by the on-board generator driven by the engine or by regenerative braking when in motion.

An important quantity for controlling and operating the battery pack is the battery power capability. The battery power capability indicates how much power the battery is capable of providing (discharge) or receiving (charge) in order to meet driver and vehicle demands.

SUMMARY

An adjustable vehicle traction battery charge setpoint strategy is disclosed which enables the adjustment of the maximum battery State of Charge (SOC) setpoint used for battery charging from the electric utility grid. Based on knowledge of the upcoming route and related driving behavior, the vehicle can calculate a setpoint less than the maximum battery SOC charging setpoint so that when the vehicle begins operation, it can utilize regenerative braking and historical driving behavior to allow the battery charge to be maximized during the trip.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
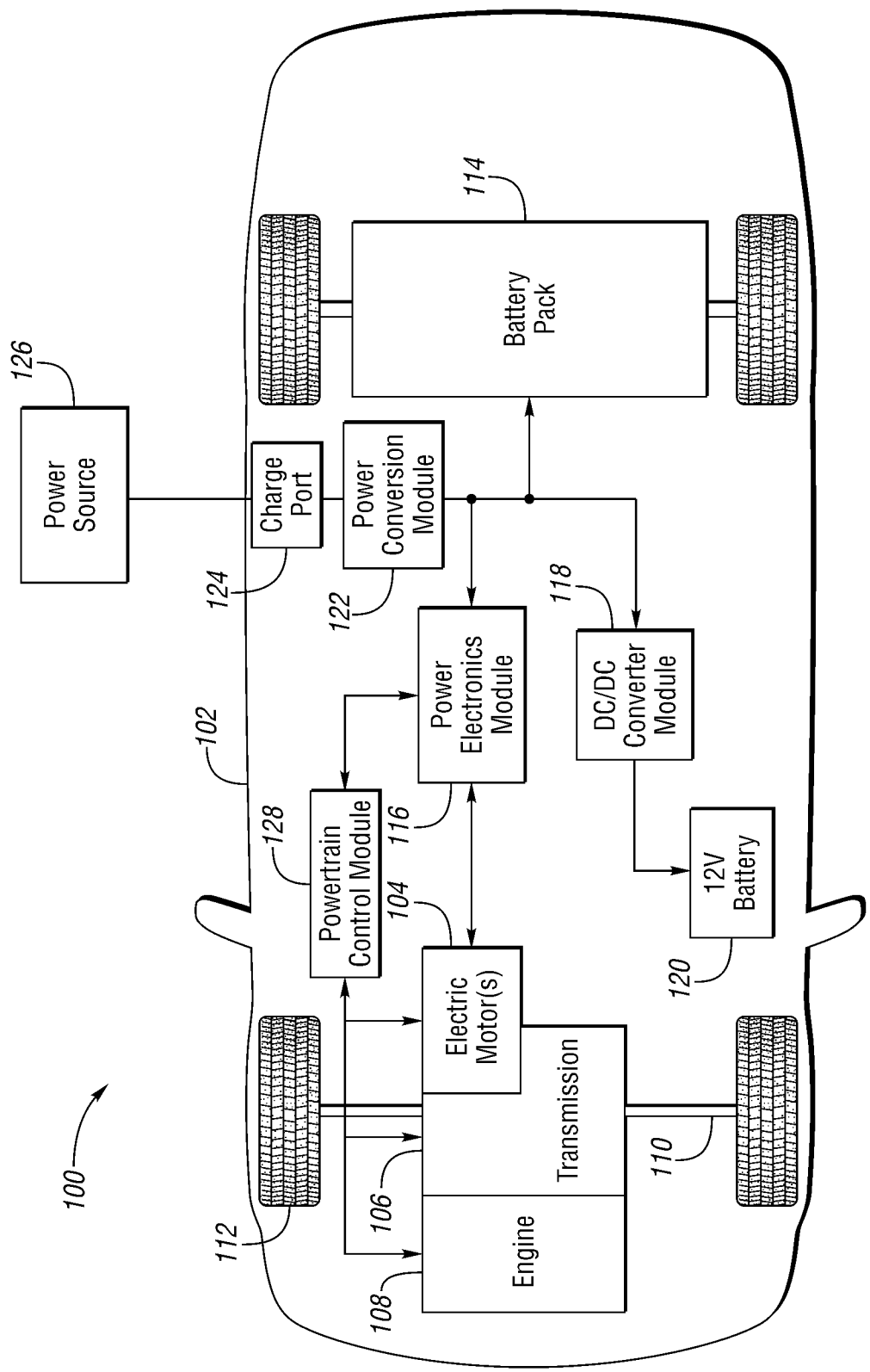
FIG. 1 illustrates an example hybrid-electric vehicle with a battery pack.

FIG. 1 depicts an example of a plug-in hybrid-electric vehicle. A plug-in hybrid-electric vehicle 102 may comprise one or more electric motors 104 mechanically connected to a hybrid transmission 106. In addition, the hybrid transmission 106 is mechanically connected to an engine 108. The hybrid transmission 106 may also be mechanically connected to a drive shaft 110 that is mechanically connected to the wheels 112. The electric motors 104 can provide propulsion when the engine 108 is turned on. The electric motors 104 can provide deceleration capability when the engine 108 is turned off The electric motors 104 may be configured as generators, capable of converting mechanical energy into electrical energy, and can provide fuel economy benefits by recovering energy that would normally be lost as heat in the friction braking system. The electric motors 104 may also reduce pollutant emissions since the hybrid electric vehicle 102 may be operated in electric mode under certain conditions.

The traction battery or battery pack 114 stores energy that can be used by the electric motors 104. A vehicle battery pack 114 typically provides a high voltage DC output. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 14 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors and power electronics may be controlled by a powertrain control module (PCM) 128.

In addition to illustrating a plug-in hybrid vehicle, FIG. 1 can illustrate a battery electric vehicle (BEV) if component 108 is removed. Likewise, FIG. 1 can illustrate a traditional hybrid electric vehicle (HEV) or a power-split hybrid electric vehicle if components 122, 124, and 126 are removed.

Figure 2:
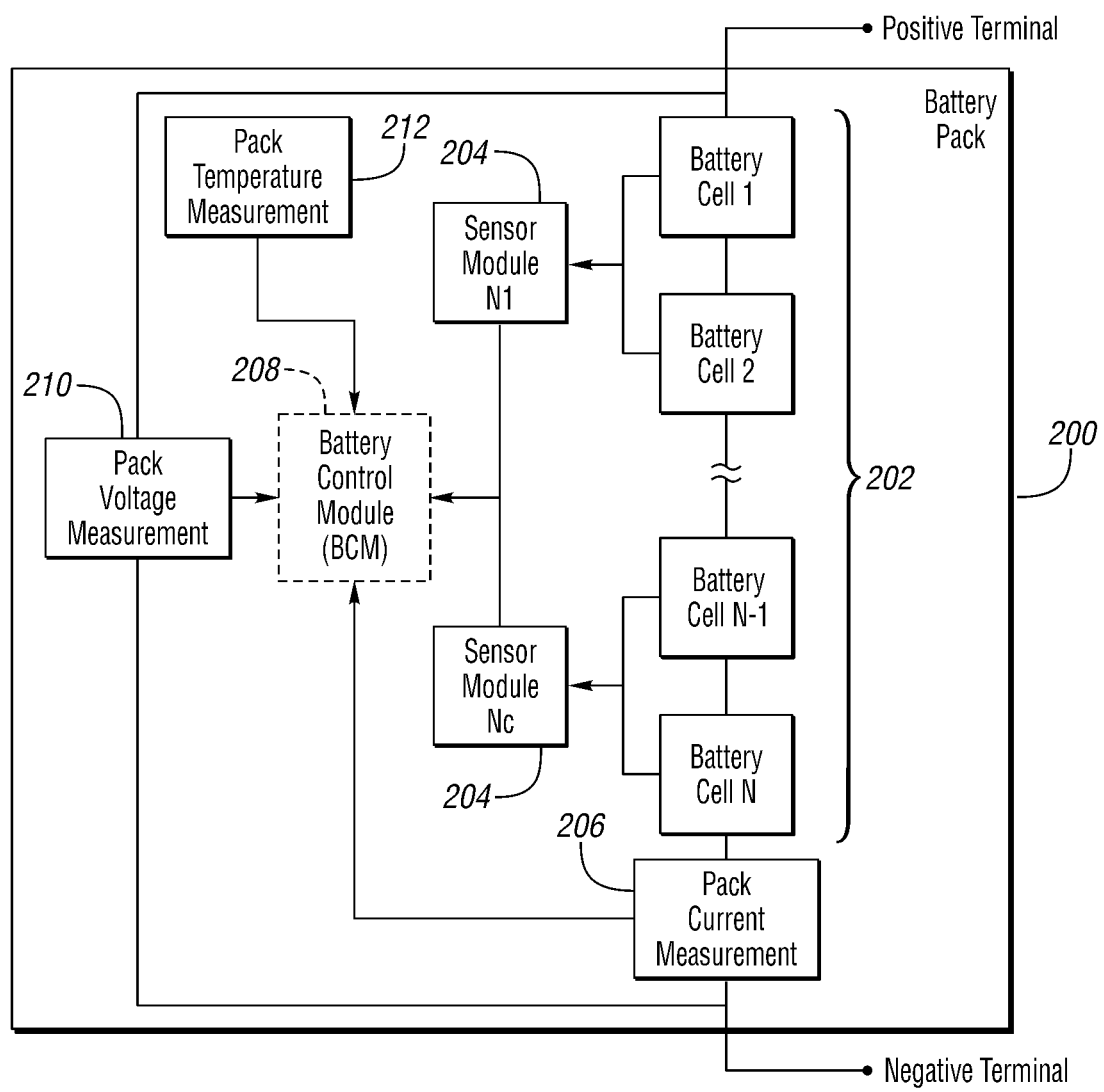
FIG. 2 illustrates a battery pack arrangement comprised of battery cells and battery cell monitoring and controlling systems.

The individual battery cells within a battery pack may be constructed from a variety of chemical formulations. Typical battery pack chemistries may include but are not limited to lead acid, nickel cadmium (NiCd), nickel-metal hydride (NIMH), Lithium-Ion or Lithium-Ion polymer. FIG. 2 shows a typical battery pack 200 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A typical system may have one or more controllers, such as a Battery Control Module (BCM) 208 that monitors and controls the performance of the battery pack 200. The BCM 208 may monitor several battery pack level characteristics such as pack current measured by a current sensor 206, pack voltage 210 and pack temperature 212. The performance of the current sensor 206 may be essential, in certain arrangements, to build a reliable battery monitoring system. The accuracy of the current sensor may be useful to estimate the battery state of charge and capacity. A current sensor may utilize a variety of methods based on physical principles to detect the current including a Hall effect IC sensor, a transformer or current clamp, a resistor where the voltage is directly proportional to the current through it, fiber optics using an interferometer to measure the phase change in the light produced by a magnetic field, or a Rogowski coil.

In addition to the pack level characteristics, there may be battery cell level characteristics that need to be measured and monitored. For example, the terminal voltage, current, and temperature of each cell may be measured. A system may use a sensor module 204 to measure the characteristics of one or more battery cell modules 202. The characteristics may include battery cell voltage, temperature, age, number of charge/discharge cycles, etc. Typically, a sensor module will measure battery cell voltage. Battery cell voltage may be voltage of a single battery or of a group of batteries electrically connected in parallel or in series. The battery pack 200 may utilize up to $N_c$ sensor modules 204 to measure the characteristics of all the battery cells 202. Each sensor module 204 may transfer the measurements to the BCM 208 for further processing and coordination. The sensor module 204 may transfer signals in analog or digital form to the BCM 208.

Figure 3:
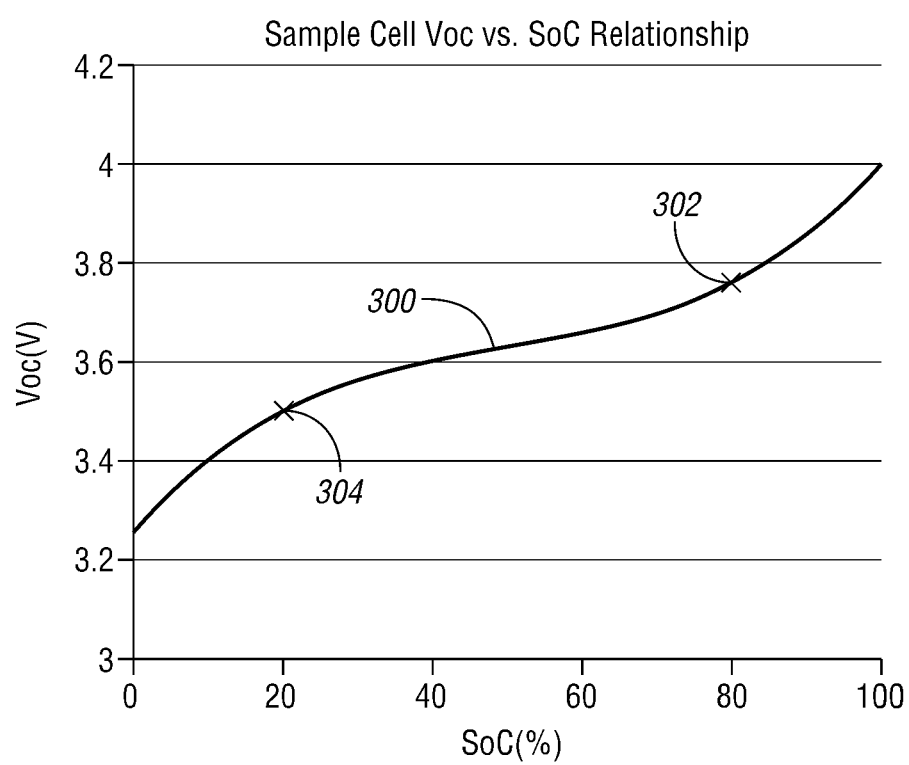
FIG. 3 is a graph that illustrates the open-circuit voltage (Voc) vs. battery state of charge (SoC) relationship for a typical Li-Ion battery cell.

For a typical Lithium-Ion battery cell, there is a relationship between SoC and the open-circuit voltage ($V_{oc}$) such that $V_{oc}=f(SoC)$. FIG. 3 is a typical curve 300 showing the open-circuit voltage, $V_{oc}$, as a function of SoC. The relationship between SoC and $V_{oc}$ may be determined from an analysis of battery properties or from testing the battery cells. The function may be such that SoC may be calculated as $f^1(V_{oc})$. The function or the inverse function may be implemented as a table lookup or an equivalent equation. The exact shape of the curve 300 may vary based on the exact formulation of the Lithium-Ion battery. The voltage, $V_{oc}$, changes as a result of charging and discharging of the battery.

There are multiple ways to determine a battery SoC including measurement of open circuit voltage, accumulation of the amount of charge that enters or exits the battery, use of a hydrometer on the battery electrolyte, impedance spectroscopy and quantum magnetism. The measurement of open circuit voltage requires that the load is disconnected from the battery and that the battery terminals are "floating." Along with the terminals "floating," the battery must "rest" or settle before the measurement is taken. If the battery is under load where current is flowing into or out of the battery, when the battery terminals are disconnected, the open circuit voltage will not be an accurate representation of the battery SoC until the charge has settled. Due to this aspect, using the open circuit voltage is not an ideal way to determine the battery SoC while the battery is in operation. The use of Coulomb counting is a preferred method while the battery is in operation. This method measures the current traveling into or out of the battery during a given period of time. One problem with this method is that if there is a fault in the current sensor, the calculation of the battery SoC will not be accurate. During operation of a hybrid vehicle, it is critical to accurately determine the battery SoC so that the BCM 208 can utilize the full operational range of the battery SoC.

Figure 4:
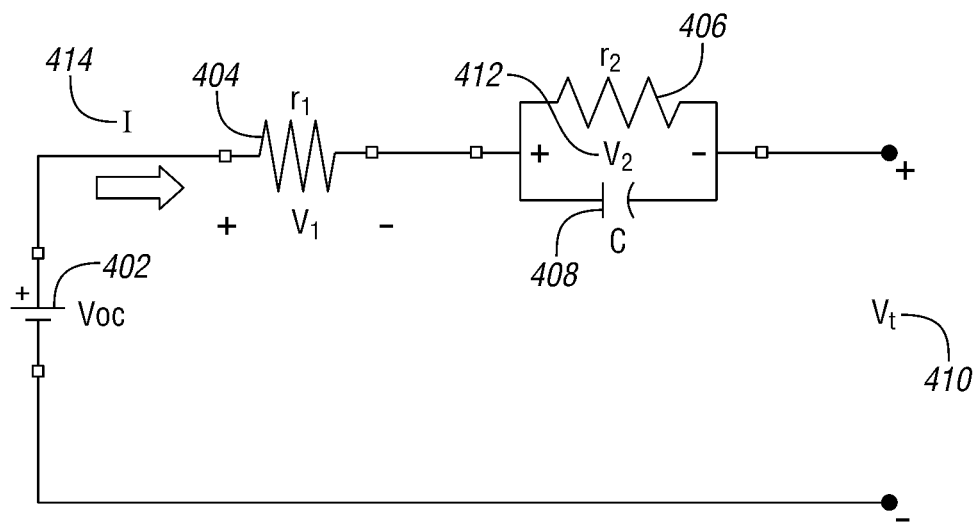
FIG. 4 is a diagram of an example battery cell equivalent circuit.

FIG. 4 shows one possible battery cell equivalent circuit model (ECM). A battery cell can be modeled as a voltage source ($V_{oc}$) 402 having resistances (404 and 406) and capacitance 408 associated with it. Because of the battery cell impedance, the terminal voltage, $V_t$ 410, is typically not the same as the open-circuit voltage, $V_{oc}$ 402. The open-circuit voltage, $V_{oc}$ 402, is not readily measurable as only the terminal voltage 410 of the battery cell is accessible for measurement. Because the $V_{oc}$ 402 is not readily measurable, a model-based method may be used to estimate the value. A model may require that the values of resistance and capacitance be known or estimated. The battery cell model may depend on the battery chemistry. The precise model chosen for the battery cell is not necessarily critical to the methods described.

For a typical Lithium-Ion battery cell, there is a relationship between SOC and the open-circuit voltage ($V_{oc}$) such that $V_{oc}=f(SOC)$. FIG. 3 shows a typical curve 300 showing the open-circuit voltage $V_{oc}$ as a function of SOC. The relationship between SOC and $V_{oc}$ may be determined from an analysis of battery properties or from testing the battery cells. The function may be such that SOC may be calculated as $f^1(V_{oc})$. The function or the inverse function may be implemented as a table lookup or an equivalent equation. The exact shape of the curve 300 may vary based on the exact formulation of the Lithium-Ion battery. The voltage $V_{oc}$ changes as a result of charging and discharging of the battery.

The governing equations for the equivalent circuit model may be written as follows:

$$\dot{V}_2 = -\frac{1}{r_2 C} V_2 + \frac{1}{C} I \qquad (1)$$

$$V_{oc} - V_t = V_2 + I r_1 \qquad (2)$$

where: $V_2$ 412 is a voltage across C 408 or $r_2$ 406 from the circuit model;

$$\dot{V}_2 = \frac{dV_2}{dt}$$

is the time based derivative of $V_2$ 412; $r_2$ 406 is a charge transfer resistance of the battery; C 412 is a double layer capacitance of the battery; I 414 is the measured battery current; $V_{oc}$ 402 is the open circuit voltage of the battery; $V_t$ 410 is the measured battery voltage across the battery terminals (terminal voltage); and $r_1$ 404 is an internal resistance of the battery.

In a typical battery system, some values, such as current I 414 and terminal voltage $V_t$ 410 may be measured directly. However, the resistance and capacitance values may vary over time and are not readily measurable. A battery impedance parameter estimation model may be required to calculate the impedance parameters of the battery. One method of estimating the parameters of a system is to utilize a recursive parameter estimation method, such as an Extended Kalman Filter. For example, an EKF may be constructed that uses the current I 414 as an input, voltage $V_2$ 412 as a state, and $V_{oc}$-$V_t$ as an output. The battery ECM impedance parameters ($r_1$ 404, $r_2$ 406, and C 408) or combinations of the parameters may also be treated as states for identification. Once the parameters and states have been identified, a battery power capability may be calculated based on the operating limits of a battery voltage and current, and the current battery state.

The electric driving distance of a PHEV or a BEV is dependent on the battery charge at the start of the trip. This battery charge is indicated by the charge setpoint. The default charging setpoint is to fully charge the battery to the maximum operational SOC.

Based on a future route from the driver's current location where the vehicle is being charged (often his home or place of employment), charging the battery to the maximum operational SOC may not be the most efficient strategy. This future route may be a complete route, or may be a partial route if only partial information is known at the time of charging. Partial information may include current vehicle elevation, historical driving data such as driver behavior, statistical data on routes taken from the current location, etc. If the driver lives or works at an increased elevation such that future travel to the next destination provides an opportunity for charging the vehicle with regenerative braking or other regenerative means including but not limited to engine charging, engine operation for diesel hybrid catalyst cleaning, engine operation for catalyst heating, engine operation to power accessories such as a window defroster, engine operation to heat the vehicle, engine operation to heat the battery pack, solar energy capture and inductive charging along the road, the default charging strategy may not be efficient as the vehicle will not allow itself to overcharge the battery. An example would be living or working high up in a mountainous region where the driver starts each trip by driving downhill from the charging station such that the regenerative energy will be lost with the default charging strategy.

A solution is to determine the charge setpoint based on a future battery maximum net SOC increase during the next trip. The greatest future battery SOC increases or maximum net SOC increase may be for multiple reasons including regenerative braking based on the upcoming route, engine use and driving behavior. The upcoming route may be the next route and/or next destination. The upcoming route may be determined at the end of the "previous" trip before the vehicle is connected to a battery charger, or sometime before departure to the next route. The input of the next route can be done in multiple ways including but not limited to (i) direct driver input of the next trip, (ii) predicting battery SOC increases based on the driver's previous driving history, (iii) using GPS or other navigation data to determine the elevation and routes from the current location. In the event that the driver does not input future trip information before exiting the vehicle, a predictive system may be used to determine future SOC increases and profile. If the upcoming destination is obtained, the vehicle may calculate the most likely route to that destination and the associated SOC profile.

Conditional driving behavior predicted through past driving history provides information regarding energy usage or energy recuperation potentials. The conditional driving behavior includes road information, traffic information, posted speed limits, and traffic signs, etc. Generic analysis on the energy profiles may be derived from predicted or assigned destinations with route information. Driver's average behavior on given road condition (posted speed, road grade, curvature, time of day, weather, traffic, traffic lights, road signs, etc.) is data used to influence the energy analysis.

After determining the future route and driving behavior, the system analyzes the next entered, determined or predicted route in order to predict the energy increases or decreases at each point along the route. This is a predicted calculation of the SOC increase for each segment of the route due to SOC increases including regenerative braking in a "brake section" or engine-generator energy generation and SOC decreases during energy uses including "climbing a hill" between braking sections or battery accessory uses. The relationship between geographical attributes and SOC contribution is inverted; downhill driving gives an upwards slope or positive net contribution of SOC and uphill driving gives a downwards slope or negative net consumption of SOC.

Predicting the net maximum SOC increase during a future vehicle operation requires knowledge of the current SOC and predicting the future SOC profile during the next vehicle trip.

Figure 5:
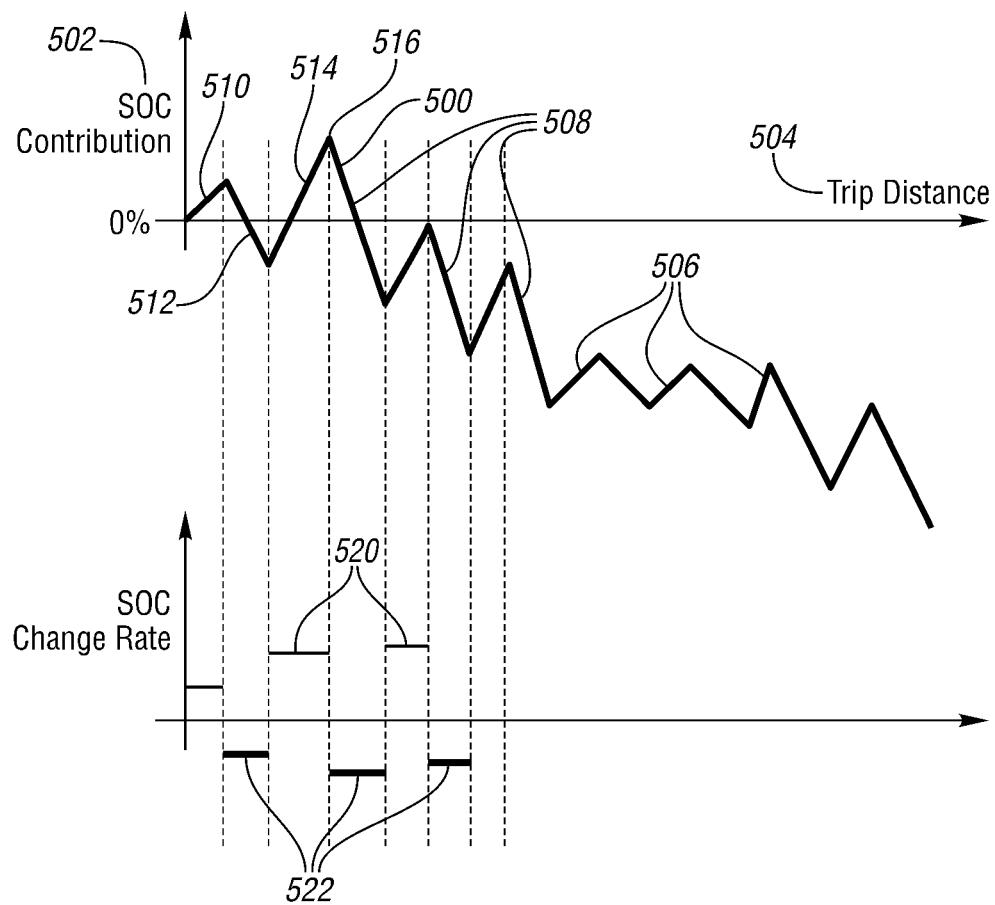
FIG. 5 is an illustration of SOC contribution and change rate with respect to location of a route.

FIG. 5 shows an example complete SOC contribution profile 500. This SOC profile 500 is a plot of the SOC contribution 502 with respect to trip distance 504 which is the spatial location of the vehicle along the trip. The upwards slopes 506 are positive contribution of energy from predicted regenerative braking and the downward slopes 508 are negative contribution of energy for the up-hill sections where the vehicle consumes energy to go up the hills. The upwards slopes 506 have a corresponding positive SOC change rate 520, and the downwards slopes 508 have a corresponding negative SOC change rate 522. In the example, the driver starts his trip with a slight downhill section 510, followed by a longer uphill section 512 and then another downhill section 514.

When the upcoming route has been determined and the SOC contributions for each segment of the trip have been compiled, the maximum SOC level 516 is identified. With this net maximum SOC contribution 516 determined, the next step is to align this maximum level of contribution with the maximum SOC as shown in FIG. 6.

Figure 6:
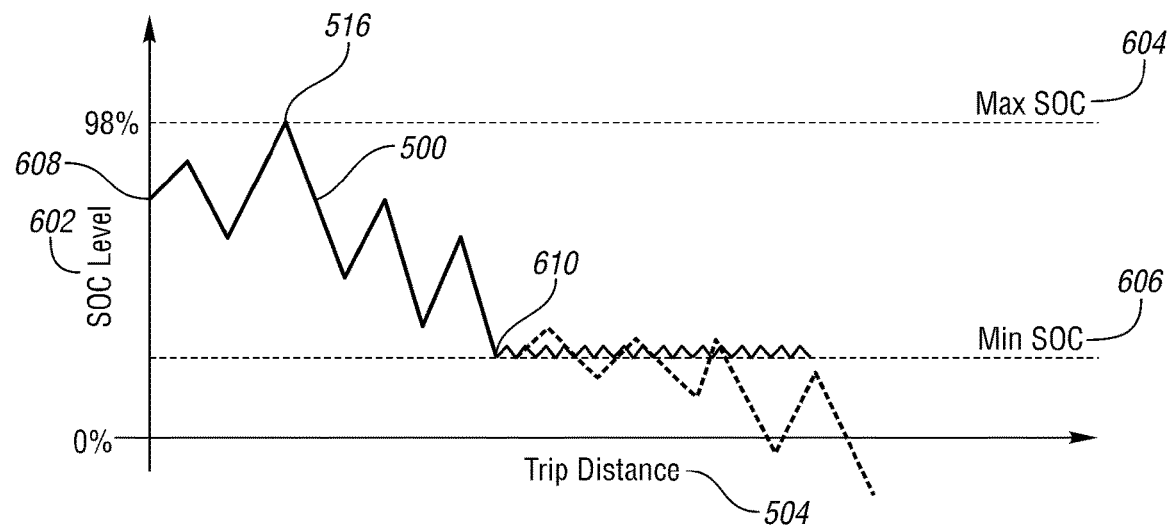
FIG. 6 illustrates SOC with respect to location of a route after the battery charge set-point has been optimized for the route.

FIG. 6 is a plot of the SOC level 602 with respect to trip distance 504 which is the spatial location of the vehicle along the trip. In this example plot, the maximum SOC level 604 and the minimum SOC level 606 provide a battery operating range. The complete SOC profile 500 is adjusted such that the maximum SOC contribution 516 is aligned with the maximum SOC level 604. From this the desired starting SOC value 608 can be determined. Also, the intersection point 610 at which the battery SOC profile 500 will intersect the minimum SOC level 606 can be determined. The intersection point 610 is where the vehicle control will transition from normal operation to a charge sustaining mode of operation.

Figure 7:
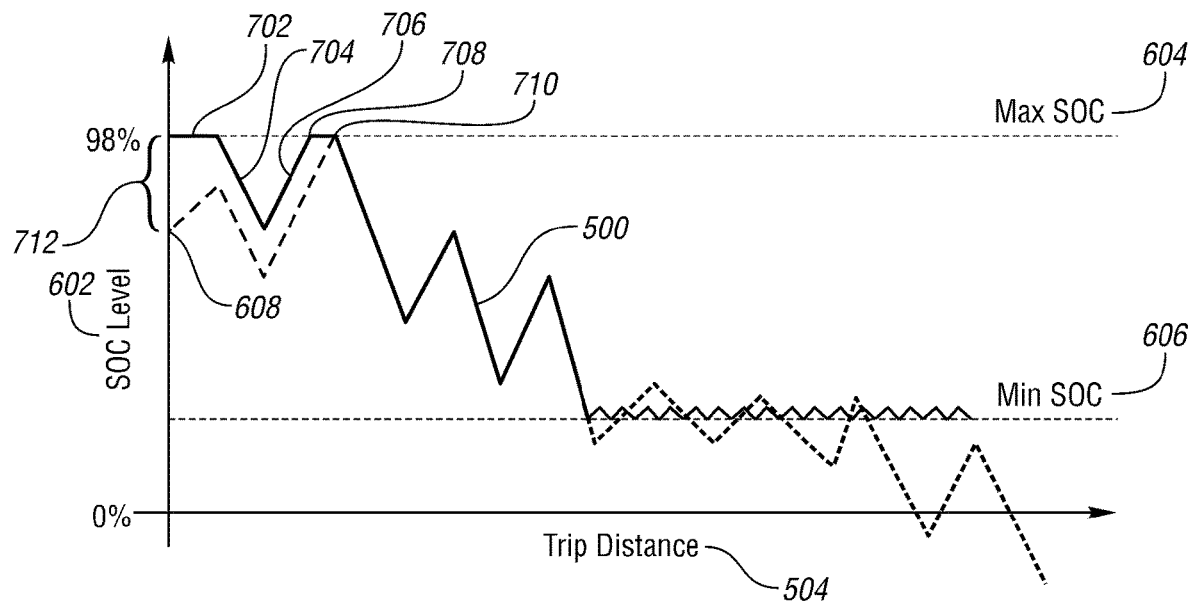
FIG. 7 illustrates the overlay of SOC with respect to location of a route after the battery charge set-point has and has not been optimized for the route.

A comparison of the SOC profiles of the adjusted starting SOC 608 with the default strategy where the battery is charged to the maximum starting SOC or maximum SOC level 604 is shown in FIG. 7. As illustrated in FIG. 7, the default strategy does not perform any planning for the future route, driving behavior analysis, and subsequently, energy analysis. The default strategy is unable to make use of the initial regeneration from the initial small downhill, subsequent regenerative segments or SOC increase segments, maintaining the charge at the Max SOC level 604 illustrated by segment 702. As soon as the first segment with an SOC decrease is reached, the vehicle draws energy for propulsion or other accessories and the SOC drops as illustrated in segment 704. When other SOC increases occur, the vehicle can recapture energy again 706 until the SOC reaches the maximium SOC level 604 at point 708. From the end of this SOC increase 710, the vehicle will behave exactly like the "optimal" solution.

As illustrated in FIG. 7, after the max SOC contribution point 710, the optimal and the default strategies will behave exactly the same. The optimal strategy based on the adjusted started SOC 608 started the trip with a lower amount of charge in the battery as indicated by the lower SOC. This lower initial charge requires less energy from the charging port resulting in a lower charging cost from the grid. The energy savings is the difference 712 between the maximum SOC level 604 and the desired starting SOC 608. By using an optimizing strategy to determine the desired starting SOC 608 which is an optimal SOC setpoint based on the future trip, the battery can be charged to the desired SOC starting point 608 saving energy by not applying a "top charge" energy 712 and instead allowing the vehicle to recharge the battery during operation. By selecting charge set point based on future trip analysis, it is possible to recuperate more regenerative braking energy and lower electricity cost from the power grid. Another advantage is that more regenerative braking energy recovery results in vehicle braking performed by the generator and not the brake pads providing longer friction brake life. Also, for the same trip, the overall SOC level (RMS) is lower than that using a default setpoint. The lower RMS SOC level may reduce the battery aging process resulting in longer battery life.

Figure 8:
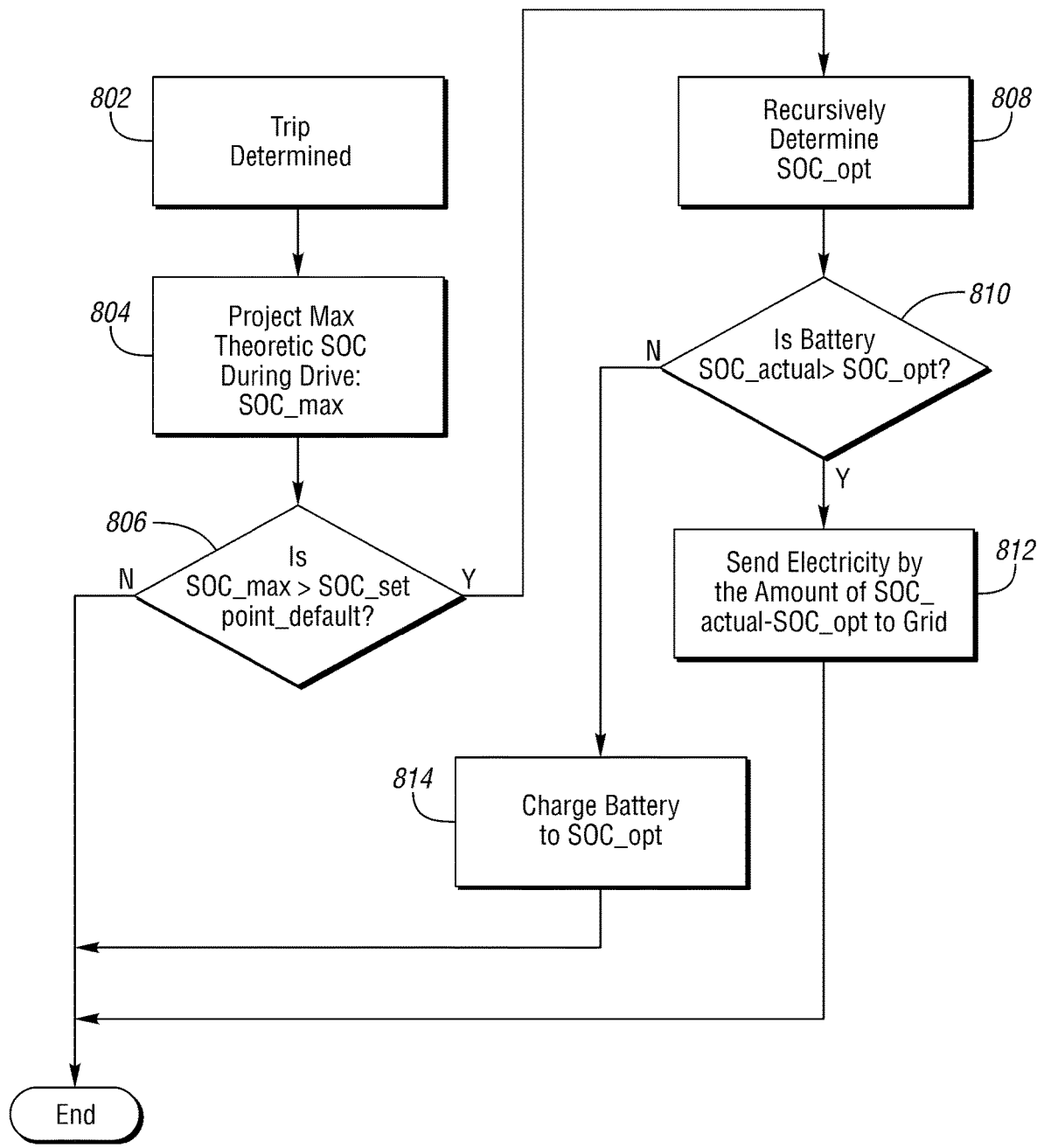
FIG. 8 illustrates a flow diagram of fault detection determined at the end of a single power cycle.

FIG. 8 is a flow chart to determine the optimal charge setpoint. This flow chart may be implemented on a microprocessor, microcontroller, programmable logic device, ASIC, or other digital or analog system, furthermore, this flowchart may be implemented using a deterministic model, probabilistic model, fuzzy logic, or other means. In block 802 the future route and performance energy analysis is calculated using either driver input, route prediction, traffic data, historical data, GPS data or similar information. In block 804, the projected maximum SOC during the trip or route is calculated based on route energy analysis. This can be a projection of the theoretic SOC traced along the route based on the maximum regenerative braking recuperated without considering upper SOC limit. In block 806 the maximum theoretical SOC is compared with the SOC setpoint, if the maximum theoretical SOC is greater than the current SOC setpoint then the optimal SOC is determined in block 808. This optimal SOC setpoint may be determined recursively. In block 810 the battery SOC is compared with the optimal SOC, if the battery SOC is greater than the optimal SOC then battery power can be sent back to the grid in block 812. If the battery SOC is less than the optimal SOC then the battery can be charged to the optimal SOC in block 814.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, FLASH devices, MRAM devices and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
 a battery having a state of charge (SOC) and a maximum SOC setpoint; and at least one controller programmed to
charge the battery with power from an electric power grid electrically connected with the vehicle to a SOC setpoint defined by a difference between the maximum SOC setpoint and a net maximum increase in the SOC predicted for a next vehicle route that includes a regenerative event responsive to the SOC setpoint being greater than the SOC, discharge the battery to the electric power grid responsive to the SOC setpoint, defined by the difference between the maximum SOC setpoint and the net maximum increase in the SOC predicted for the next vehicle route that includes the regenerative event, being less than the SOC, and operate the vehicle, from a beginning of the next route until transition to a charge sustaining mode of operation that results from the SOC intersecting a minimum SOC level, such that the battery is only charged via regenerative braking energy capture.

2. A method of controlling a power system for a vehicle comprising:

calculating an optimal state of charge (SOC) for a battery based on data describing a next route of travel such that a difference between a maximum SOC for the battery and the optimal SOC is approximately equal to a predicted net maximum increase in SOC for the next route of travel;

measuring a current SOC for the battery;

comparing the optimal and current SOCs;

charging the battery with power from an electric power grid electrically connected with the vehicle to the optimal SOC responsive to the optimal SOC being greater than the current SOC; and discharging the battery to the electric power grid responsive to the optimal SOC being less than the current SOC; and operating the vehicle, from a beginning of the next route of travel until transition to a charge sustaining mode of operation that results from the current SOC intersecting a minimum SOC level, such that the battery is only charged via regenerative braking energy capture.

3. A hybrid electric vehicle comprising:

a generator;

a battery having a state of charge (SOC) and a maximum SOC setpoint; and at least one controller programmed to
charge the battery with power from an electric power grid electrically connected with the, vehicle to a SOC setpoint defined by a difference between the maximum SOC setpoint and a net maximum increase in the SOC predicted for a next route of travel that includes a regenerative event responsive to the SOC setpoint being greater than the SOC, discharge the battery to the electric power grid responsive to the SOC setpoint, defined by the difference between the maximum SOC setpoint and the net maximum increase in the SOC predicted for the next route of travel that includes a regenerative event, being less than the SOC, and operate the vehicle, from a beginning of the next route of travel until transition to a charge sustaining mode of operation that results from the SOC of the battery intersecting a minimum SOC level, such that the battery is only charged via regenerative braking energy capture.

* * * * *